United States Patent [19]

Kawamura et al.

[11] Patent Number: 5,630,185
[45] Date of Patent: May 13, 1997

[54] INFORMATION SETTING DEVICE FOR A CAMERA

[75] Inventors: Koichiro Kawamura, Ichihara; Satoshi Ejima, Tokyo, both of Japan

[73] Assignee: Nikon Corporation, Tokyo, Japan

[21] Appl. No.: 517,347

[22] Filed: Aug. 21, 1995

[30] Foreign Application Priority Data

Feb. 14, 1995 [JP] Japan ................................. 7-025594

[51] Int. Cl.6 .............................. G03B 7/00; G03B 17/00
[52] U.S. Cl. .......................... 396/223; 396/297; 396/299
[58] Field of Search ........................ 354/127.1, 289.1, 354/289.12, 474, 475; 396/297, 299, 258, 223

[56] References Cited

U.S. PATENT DOCUMENTS

| 5,189,466 | 2/1993 | Yasukawa et al. | 354/412 |
| 5,223,888 | 6/1993 | Fukahori | 354/475 |
| 5,291,236 | 3/1994 | Ohsawa et al. | 354/412 |

FOREIGN PATENT DOCUMENTS 7-104339   4/1995   Japan .

Primary Examiner—Safet Metjahic
Assistant Examiner—Eric Nelson
Attorney, Agent, or Firm—Oliff & Berridge

[57] ABSTRACT

An information setting device for a camera which, according to various photographic modes of the camera, automatically sets either a valid mode in which changing of set information is permitted or an invalid mode in which changing of set information is not permitted.

18 Claims, 14 Drawing Sheets

INFORMATION SETTING DEVICE FOR A CAMERA

Background of the Invention

1. Field of the Invention

The present invention relates to an information setting device for a camera on which various control information such as exposure values and the like can be set.

2. Description of the Related Art

An information setting device for a camera which can perform photography while any one of various exposure values such as shutter speed, aperture opening value, or the like is kept constant (hereinafter, the term "locked" will be used) is per se known: for example, refer to U.S. Pat. Serial No. 5,291,236.

Now, when photography is being performed in a specified exposure mode with an exposure value being locked, it can happen that it is required to continue to perform photography while changing over to a different exposure mode. For example, when performing photography in the shutter speed priority exposure mode with the shutter speed locked to $1/125$, it can happen that it is required to change over to the program exposure mode and to subsequently perform photography with the shutter speed and the aperture opening value being automatically selected according to a predetermined program characteristic graph.

However with prior art information setting devices for cameras the problem arises that, while photography is being performed with some exposure value locked, even if the camera is switched over to another exposure mode, unless a predetermined lock release action is performed, the lock state for the exposure value for the earlier exposure mode is maintained, and it is not possible for this exposure value to be altered in the manner appropriate for the new exposure mode.

For example, in the sample case described above, when changing over from the shutter speed priority mode with the shutter speed locked at $1/125$ to the program exposure mode, if such lock release action is not explicitly performed the shutter speed will remain locked at $1/125$, and it will not thereafter be possible to set the shutter speed according to the predetermined program characteristic graph for the program exposure mode.

SUMMARY OF THE INVENTION

The objective of the present invention is to propose an information setting device for a camera which, according to the various photographic modes of the camera, automatically sets either a valid mode which permits changing of set information, or an invalid mode which prohibits such changing.

In order to attain this objective, the information setting device of the present invention comprises: a first operation member (2, 3); a second operation member (6) which is different from the first operation member (2, 3); a setting change means (10) for changing the set content of a previously set first item of control information in response to unaccompanied operation of the first operation member (2, 3), and for changing the set content of a previously set second item of control information which differs from the first item of control information in response to a specific coordinated operation of the first operation member (2, 3) and the second operation member (6) together; an internal setting change means (10) for changing the set content of the first item of control information when the set content of the second item of control information is changed to a predetermined content by the setting change means (10), based upon the predetermined set content of the second item of control information; a valid/invalid mode setting means (5, 10) for setting one of a valid mode which permits processing for change of the set content of the first item of control information, and an invalid mode which prohibits processing for change of the set content of the first item of control information; and a valid/invalid mode changeover means (10) for changing over from the invalid mode to the valid mode when the set content of the second item of control information is changed to the predetermined content by the setting change means (10) while the invalid mode is being set.

DESCRIPTION OF THE PREFERRED EMBODIMENTS

First Preferred Embodiment

Figure 1:
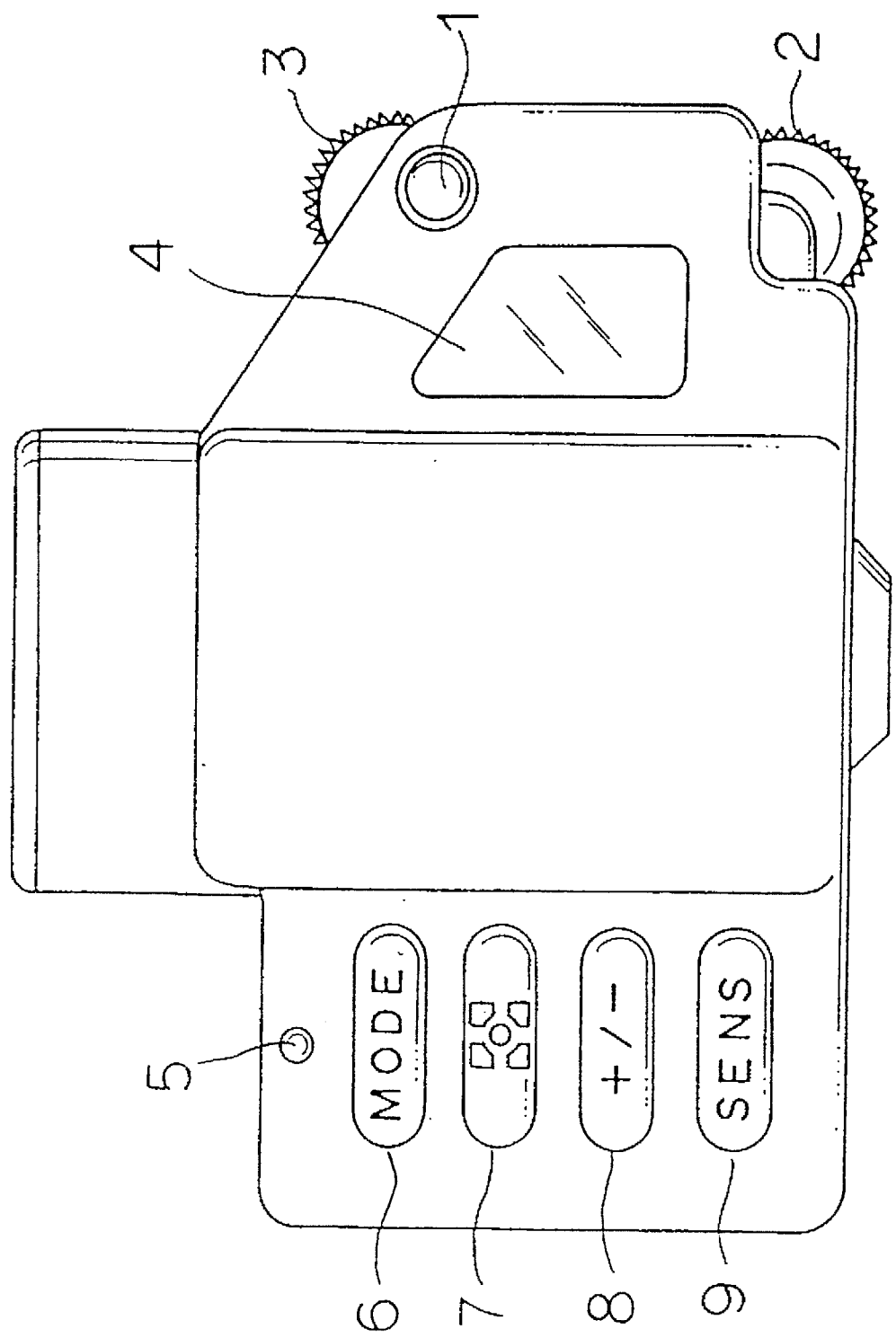
FIG. 1 is a top view showing an electronic still camera which is equipped with an information setting device according to the first preferred embodiment of the present invention.
Figure 2:
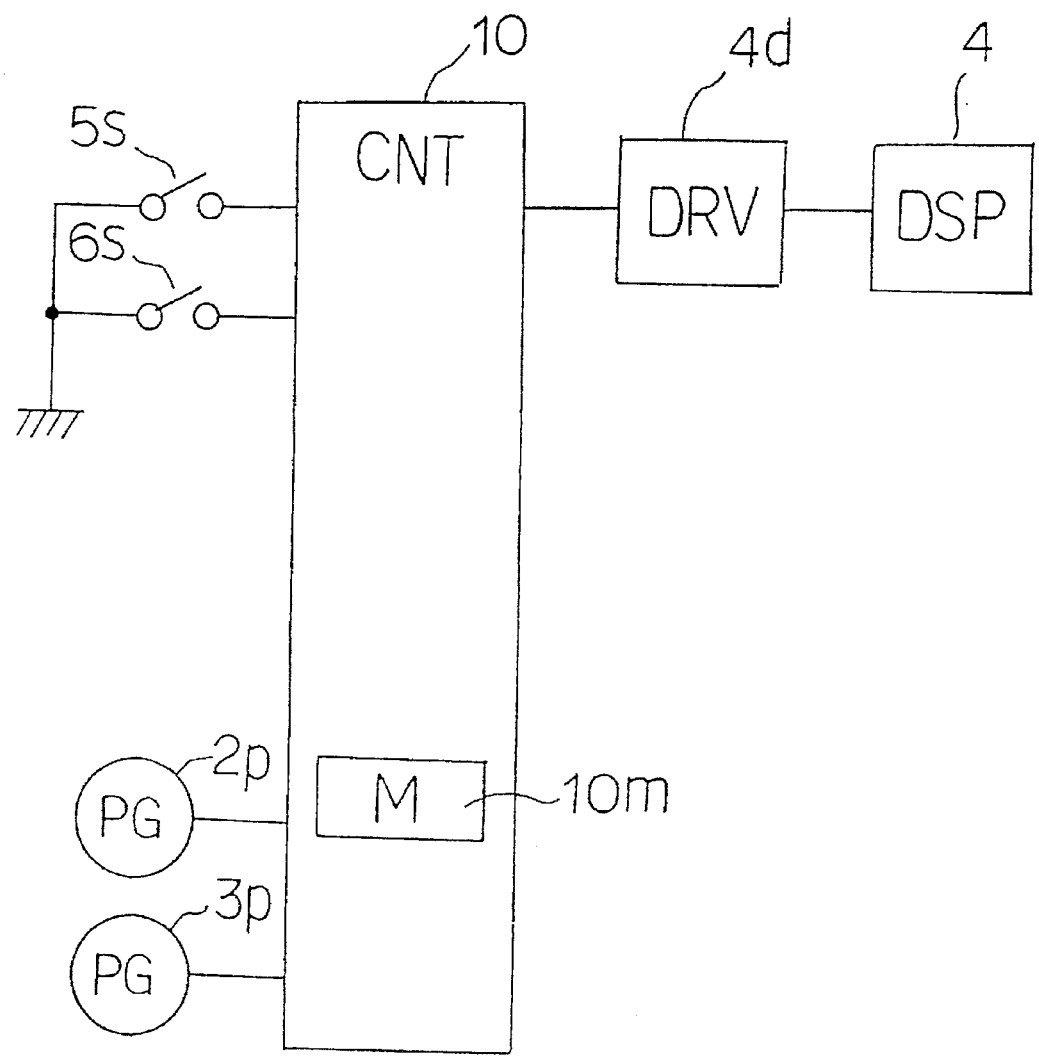
FIG. 2 is a functional block diagram showing the construction of the first preferred embodiment.

FIG. 1 is a top view showing an electronic still camera which is equipped with an information setting device according to the first preferred embodiment of the present invention, while FIG. 2 is a functional block diagram showing the construction of this first preferred embodiment, and FIGS. 3 through 6 are views showing various examples of displays provided by an LCD display panel incorporated in this first preferred embodiment.

As shown in FIG. 1, on the upper surface of this electronic still camera there are provided a shutter release button 1, a command dial 2, a subcommand dial 3, an LCD display panel 4, a lock button 5, an exposure mode button 6, a photometric mode button 7, an exposure compensation button 8, and a sensitivity changeover button 9.

When the command dial 2 is rotated while the lock button 5 is kept depressed, it is possible to lock the currently set value of the shutter speed or to release this locked state. Further, when the subcommand dial 3 is rotated while the lock button 5 is kept depressed, it is possible to lock the currently set value of the aperture opening or to release this locked state.

When the command dial 2 is rotated while the exposure mode button 6 is kept depressed, it is possible to change over between four exposure modes: an automatic program exposure mode P, a shutter speed priority exposure mode S, an aperture priority exposure mode A, and a manual exposure mode M. Further, when the command dial 2 is rotated while the photometric mode button 7 is kept depressed, it is possible to change over between various photometric modes, such as a mode for multiple segment exposure metering, a mode for center-weighted light reading, and the like.

When the command dial 2 is rotated while the exposure compensation button 8 is kept depressed, it is possible to change over between exposure compensation values. Further, when the command dial 2 is rotated while the sensitivity changeover button 9 is kept depressed, it is possible to change over the sensitivity of an imaging element not shown in the figures.

In either the shutter speed priority exposure mode S or the manual exposure mode M, provided that the shutter speed is not locked, the shutter speed can be changed by the operation of the command dial 2; while, when the shutter speed is in the locked state, the shutter speed cannot be altered by operation of the command dial 2. In other words, when the shutter speed is in the unlocked state, alteration of the shutter speed by operation of the command dial 2 is valid, while, when the shutter speed is in the locked state, alteration of the shutter speed by operation of the command dial 2 is invalid.

In either the aperture priority exposure mode A or the manual exposure mode M, provided that the aperture opening value is not locked, the aperture opening value can be changed by the operation of the subcommand dial 3; while, when the aperture opening value is in the locked state, the aperture opening value cannot be altered by operation of the subcommand dial 3. In other words, when the aperture opening value is in the unlocked state, alteration of the aperture opening value by operation of the subcommand dial 3 is valid, while, when the aperture opening value is in the locked state, alteration of the aperture opening value by operation of the subcommand dial 3 is invalid.

Referring to FIG. 2, a switch 5s is a switch which is opened and closed in unison with the operation of the lock button 5, and which goes closed circuit when the lock button 5 is pressed down. And another switch 6s is a switch which is opened and closed in unison with the operation of the exposure mode button 6, and which goes closed circuit when the exposure mode button 6 is pressed down.

When the command dial 2 is rotated, a pulse generator 2p generates a pulse signal in correspondence to the rotational direction of this rotation and the rotational amount thereof. In the same way, when the subcommand dial 3 is rotated, another pulse generator 3p generates a pulse signal in correspondence to the rotational direction of this rotation and the rotational amount thereof.

A controller 10 comprises a microcomputer and various associated peripheral circuitry therefor such as a memory 10m and the like, and performs sequence control and calculation control for this electronic still camera. The switches 5s and 6s and the pulse generators 2p and 3p are connected to this controller 10, which executes a control program which will be described hereinafter, so as to control the turning on and off of a shutter speed lock display segment and of an aperture opening value lock display segment upon the LCD display panel 4.

The LCD display panel 4 is driven via a driver 4d, and as shown in FIGS. 3 through 6 performs exposure mode display, photometric mode display, shutter speed display, aperture opening value display, shutter speed lock display, aperture opening value lock display, number of photographic frames display, and the like.

Figure 3:
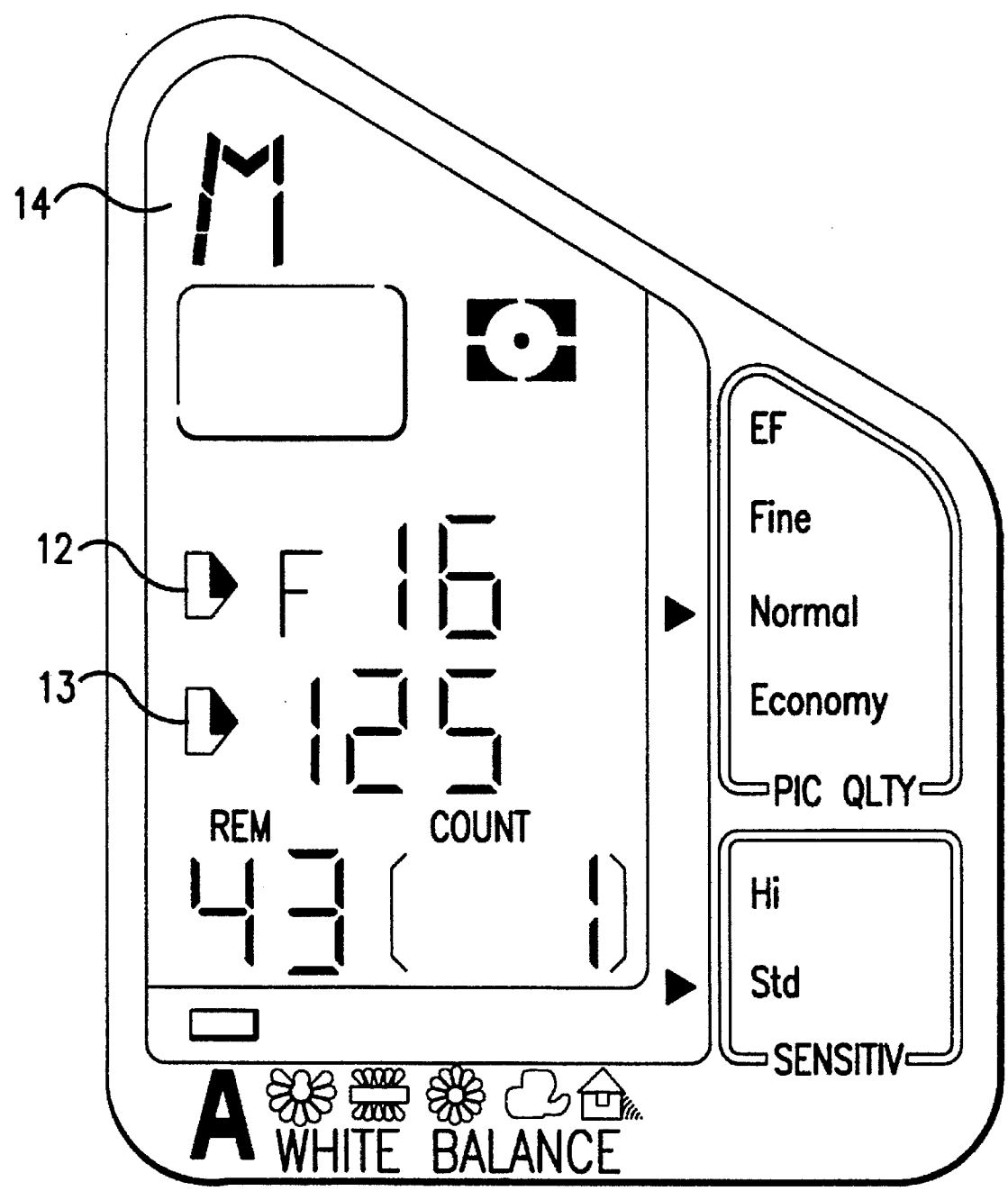
FIG. 3 is a view showing an example of a display provided by an LCD display panel incorporated in the first preferred embodiment.

FIG. 3 shows as an example the display provided by the LCD display panel 4 in the manual exposure mode M when the shutter speed is $1/125$, the aperture opening value is F16, and both of them are locked; thus, a manual exposure mode display segment 11, an aperture opening value lock display segment 12, and a shutter speed lock display segment 13 are turned on.

Figure 4:
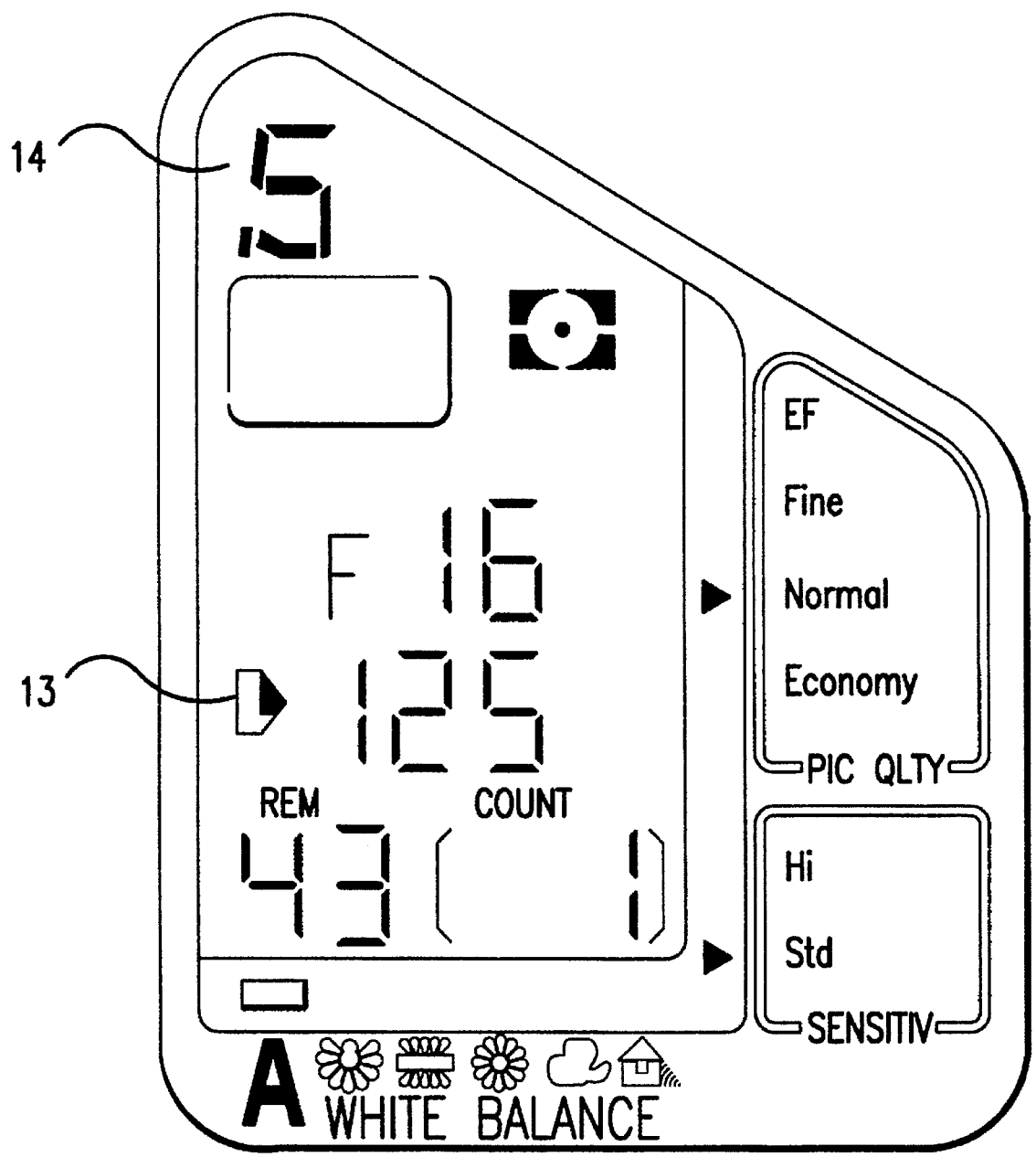
FIG. 4 is a view showing another example of the display provided by the LCD display panel incorporated in the first preferred embodiment.

FIG. 4 shows as an example the display provided by the LCD display panel 4 in the shutter speed priority exposure mode S when the shutter speed is locked at $1/125$; thus, a shutter speed priority exposure mode display segment 14 and the shutter speed lock display segment 13 are turned on, while the aperture opening value lock display segment 12 is turned off.

Figure 5:
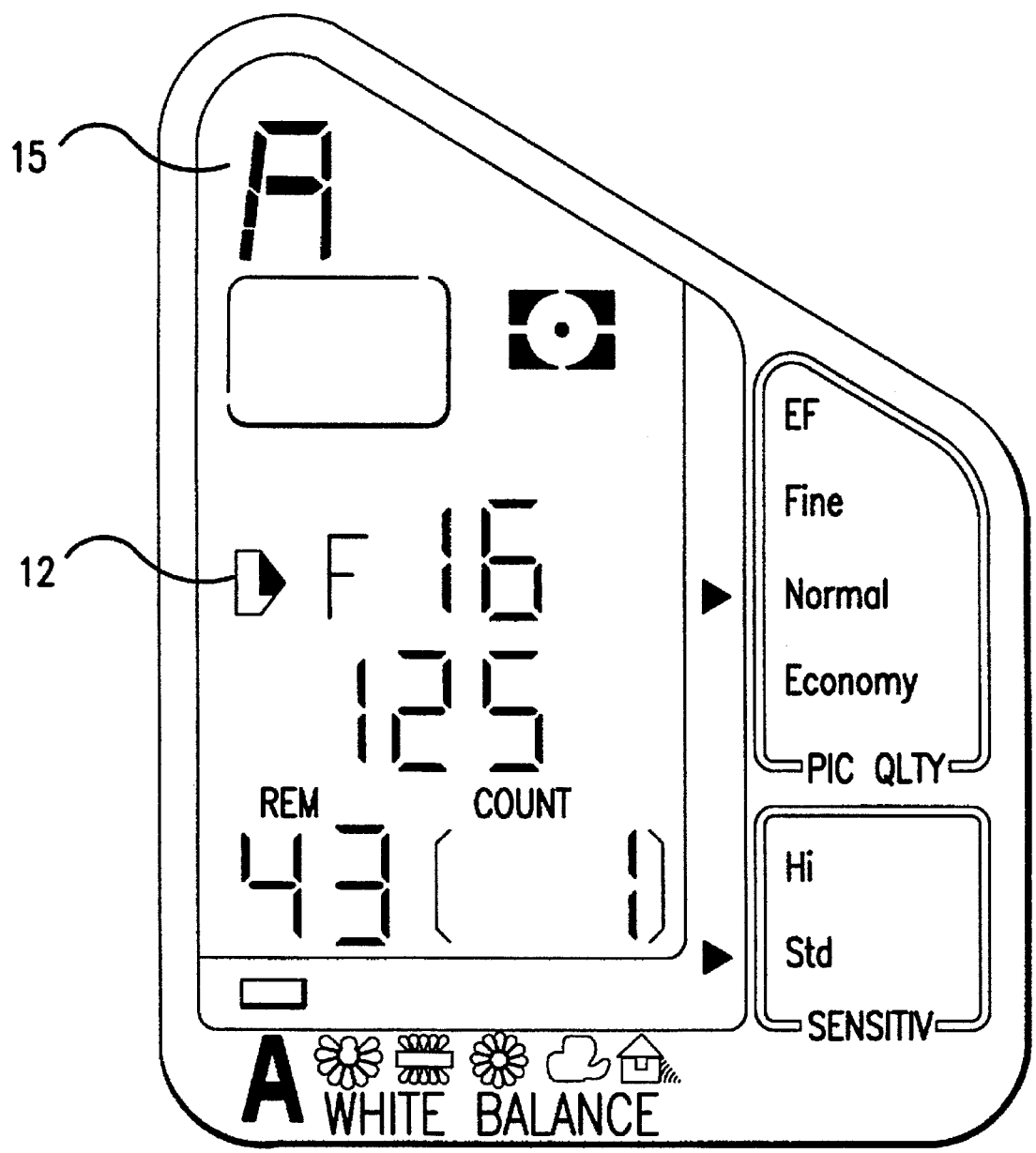
FIG. 5 is a view showing another example of the display provided by the LCD display panel incorporated in the first preferred embodiment.

FIG. 5 shows as an example the display provided by the LCD display panel 4 in the aperture priority exposure mode A when the aperture opening value is locked at F16; thus, an aperture priority exposure mode display segment 15 and the aperture opening value lock display segment 12 are turned on, while the shutter speed lock display segment 13 is turned off.

Figure 6:
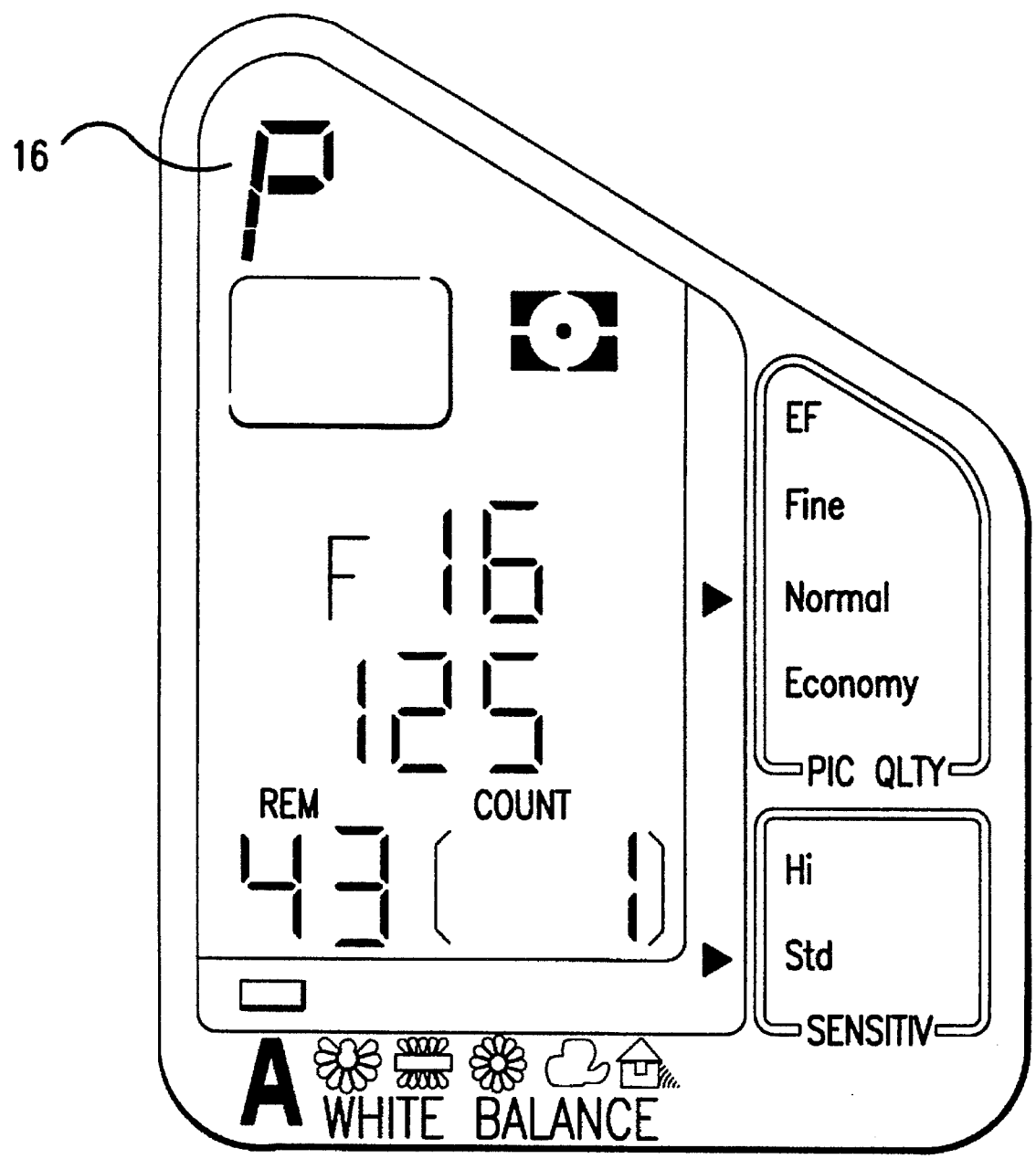
FIG. 6 is a view showing another example of the display provided by the LCD display panel incorporated in the first preferred embodiment.

And, FIG. 6 shows as an example the display provided by the LCD display panel 4 in the automatic program exposure mode P when the shutter speed and the aperture opening value are both in the unlocked state; thus, an automatic program exposure mode display segment 16 is turned on, while the aperture opening value lock display segment 12 and the shutter speed lock display segment 13 are both turned off.

No detailed illustration of various portions of the concrete construction shown in FIGS. 1 through 6 which are not directly relevant to the present invention has been provided, and description thereof has been curtailed in the interests of brevity.

The flow charts shown in FIGS. 7 through 10 show the control programs executed by the microcomputer incorporated in the controller 10 for controlling the locking and unlocking of the shutter speed and of the aperture opening value. The operation of the first preferred embodiment of the present invention, will now be explained with reference to these flow charts.

Figure 7:
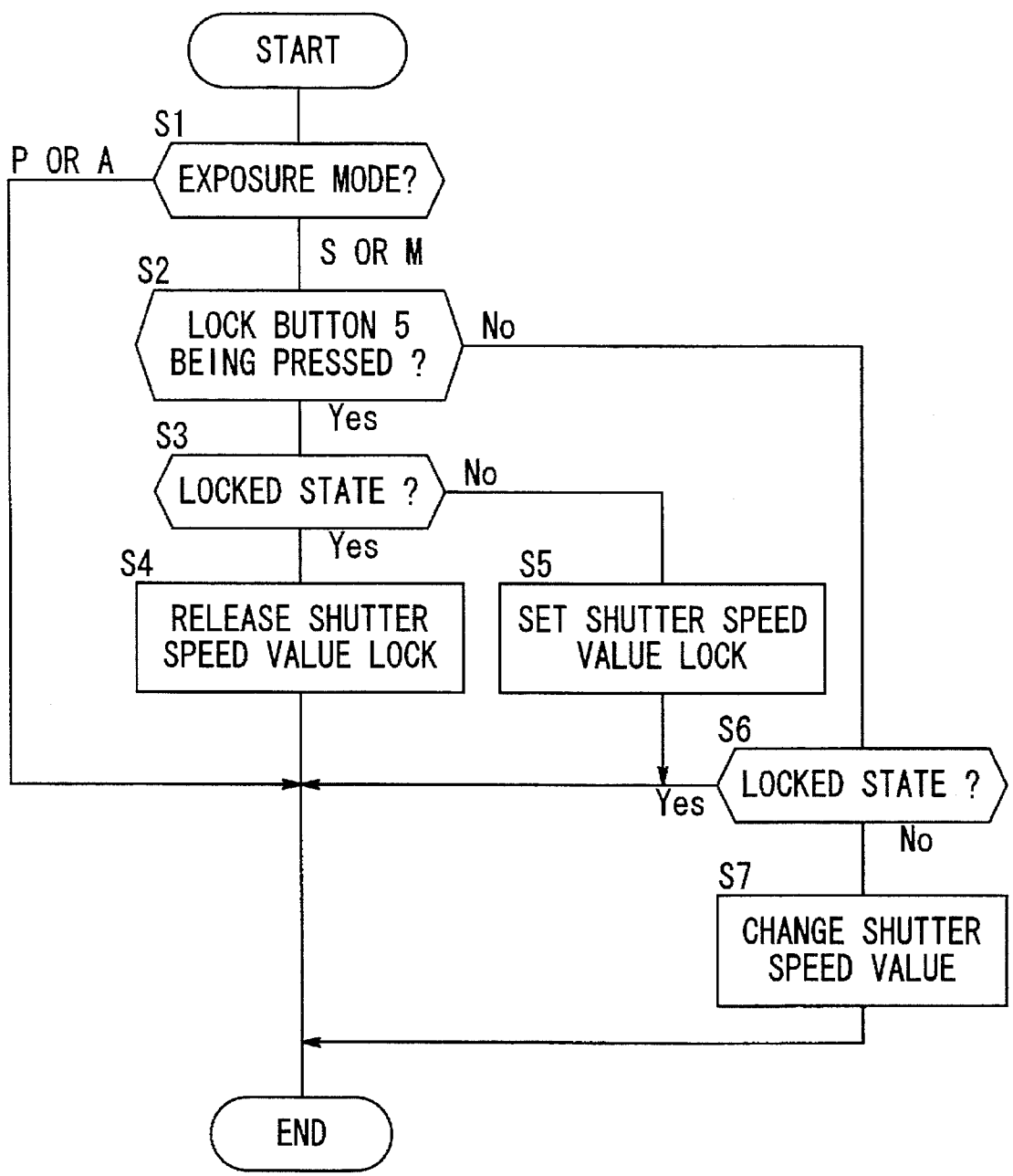
FIG. 7 is a flow chart showing the operation of a program for controlling shutter speed lock and unlock and shutter speed change, for the first preferred embodiment.

The operation in the shutter speed priority exposure mode S or in the manual exposure mode M for locking and unlocking the shutter speed, and for altering the shutter speed, will now be explained with reference to the FIG. 7 flow chart.

When the command dial 2 is operated by being rotated so that the pulse signal output by the pulse generator $2p$ in association therewith is input into the controller 10, the microcomputer incorporated in this controller 10 starts to execute this control program. In the step S1, a decision is made as to whether or not the currently set exposure mode is the shutter speed priority exposure mode S or the manual exposure mode M; and if the currently set exposure mode is indeed the shutter speed priority exposure mode S or the manual exposure mode M then the flow of control proceeds to the step S2, while if the currently set exposure mode is the automatic program exposure mode P or the aperture priority exposure mode A then the execution of this control program is terminated.

When the currently set exposure mode is indeed the shutter speed priority exposure mode S or the manual exposure mode M, then in the step S2 a decision is made, from the output of the switch $5s$, as to whether or not the lock button 5 is being pressed. If the lock button 5 is being pressed then the flow of control proceeds to the step S3, while if not then the flow of control is transferred to the step S6.

Because rotation of the command dial 2 while the lock button 5 is being held depressed is the operation for locking or unlocking the shutter speed, in the step S3 the currently set locked or unlocked state of the shutter speed, as stored in the memory 10 m, is read out therefrom, and a decision is made as to whether or not the locked state is current. If the shutter speed is currently locked, then the flow of control continues to the step S4, in which this locked state is released, and further the unlocked state for the shutter speed is stored in the memory 10 m.

However, if the shutter speed is currently not locked, then the flow of control is transferred to the step S5, in which the presently set value of shutter speed is locked, and further the locked state for the shutter speed is stored in the memory 10 m.

If, in the shutter speed priority exposure mode S or the manual exposure mode M, merely the command dial 2 is rotated, i.e. without the lock button 5 being held depressed, then it is concluded that this is the operation for altering the currently set value of the shutter speed, and the flow of control is transferred to the step S6, in which the currently set locked or unlocked state of the shutter speed, as stored in the memory 10 m, is read out therefrom, and a decision is made as to whether or not the locked state is current. If the shutter speed is currently locked, then, since in this case the operation of the command dial 2 in order to alter the shutter speed value is invalid, nothing is done even although the command dial 2 has been operated, and the execution of this control program is terminated.

However, if the shutter speed is not currently locked, then, since in this case the operation of the command dial 2 in order to alter the shutter speed value is valid, accordingly the shutter speed value is altered based upon the pulse signal input from the pulse generator $2p$, i.e. in correspondence to the rotational direction of the rotation of the command dial 2 and in correspondence to the rotational amount thereof; and the new value for shutter speed is displayed upon the LCD display panel 4.

Figure 8:
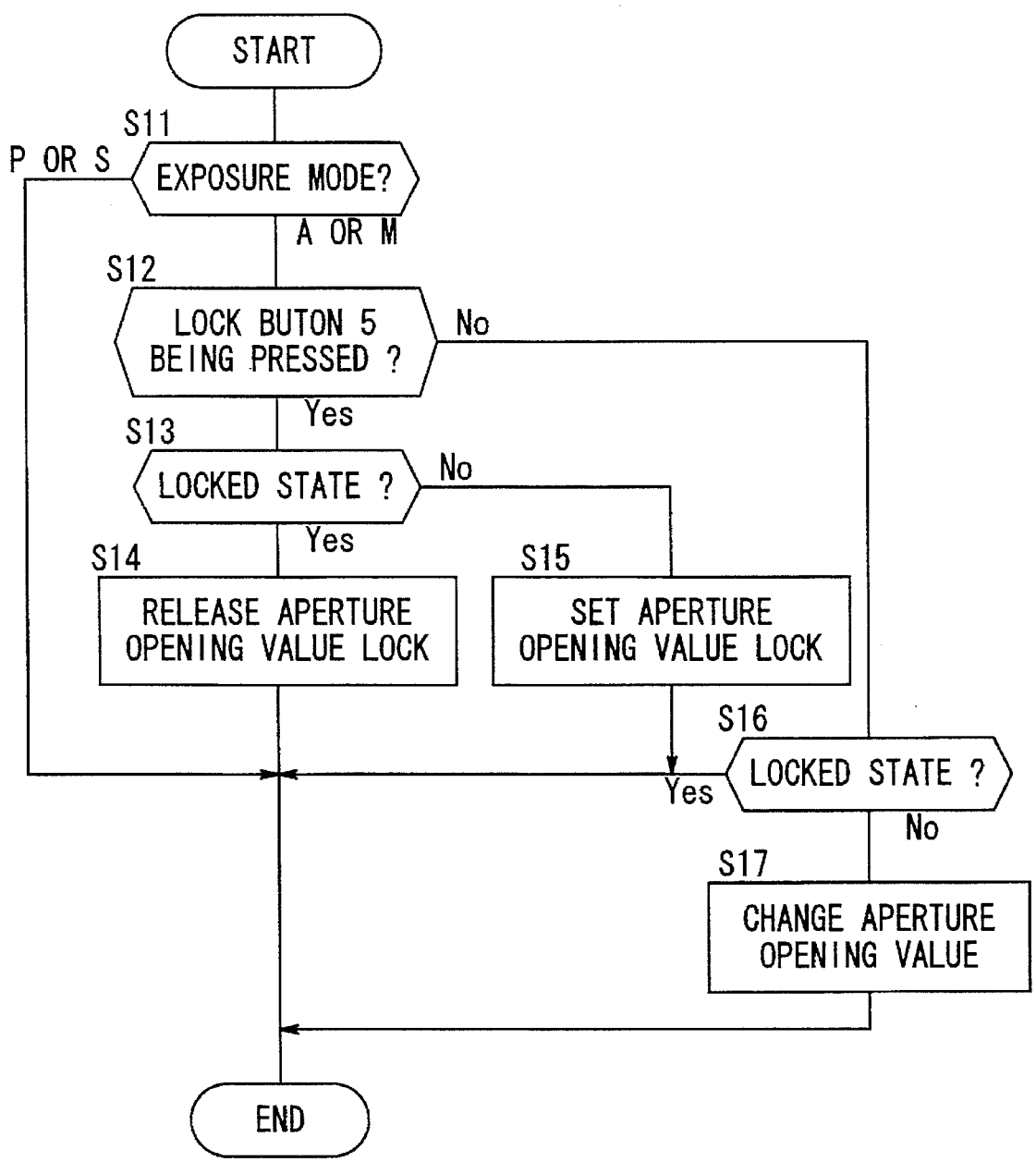
FIG. 8 is a flow chart showing the operation of a program for controlling aperture opening value lock and unlock and aperture opening value change, for the first preferred embodiment.

The operation in the aperture priority exposure mode A or in the manual exposure mode M for locking and unlocking the aperture opening value, and for altering the aperture opening value, will now be explained with reference to the FIG. 8 flow chart.

When the subcommand dial 3 is operated by being rotated so that the pulse signal output by the pulse generator $3p$ in association therewith is input into the controller 10, the microcomputer incorporated in this controller 10 starts to execute this control program. In the step S11, a decision is made as to whether or not the currently set exposure mode is the aperture priority exposure mode A or the manual exposure mode M; and if the currently set exposure mode is indeed the aperture priority exposure mode A or the manual exposure mode M then the flow of control proceeds to the step S12, while if the currently set exposure mode is the automatic program exposure mode P or the shutter speed priority exposure mode S then the execution of this control program is terminated.

When the currently set exposure mode is indeed the aperture priority exposure mode A or the manual exposure mode M, then in the step S12 a decision is made, from the output of the switch $5s$, as to whether or not the lock button 5 is being pressed. If the lock button 5 is being pressed then the flow of control proceeds to the step S13, while if not then the flow of control is transferred to the step S16.

Because rotation of the subcommand dial 3 while the lock button 5 is being held depressed is the operation for locking or unlocking the aperture opening value, in the step S13 the currently set locked or unlocked state of the aperture opening value, as stored in the memory 10 m, is read out therefrom, and a decision is made as to whether or not the locked state is current. If the aperture opening value is currently locked, then the flow of control continues to the step S14, in which this locked state is released, and further the unlocked state for the aperture opening value is stored in the memory 10 m.

However, if the aperture opening value is currently not locked, then the flow of control is transferred to the step S15, in which the presently set value of the aperture opening is locked, and further the locked state for the aperture opening value is stored in the memory 10 m.

If, in the aperture priority exposure mode A or the manual exposure mode M, merely the subcommand dial 3 is rotated, i.e. without the lock button 5 being held depressed, then it is concluded that this is the operation for altering the currently set value of the aperture opening, and the flow of control is transferred to the step S16, in which the currently set locked or unlocked state of the aperture opening value, as stored in the memory 10 m, is read out therefrom, and a decision is made as to whether or not the locked state is current. If the aperture opening value is currently locked, then, since in this case the operation of the subcommand dial 3 in order to alter the aperture opening value is invalid, nothing is done even although the subcommand dial 3 has been operated, and the execution of this control program is terminated.

However, if the aperture opening value is not currently locked, then, since in this case the operation of the subcommand dial 3 in order to alter the aperture opening value is valid, accordingly the aperture opening value is altered based upon the pulse signal input from the pulse generator $3p$, i.e. in correspondence to the rotational direction of the rotation of the subcommand dial 3 and in correspondence to the rotational amount thereof; and the new value for aperture opening is displayed upon the LCD display panel 4.

Figure 9:
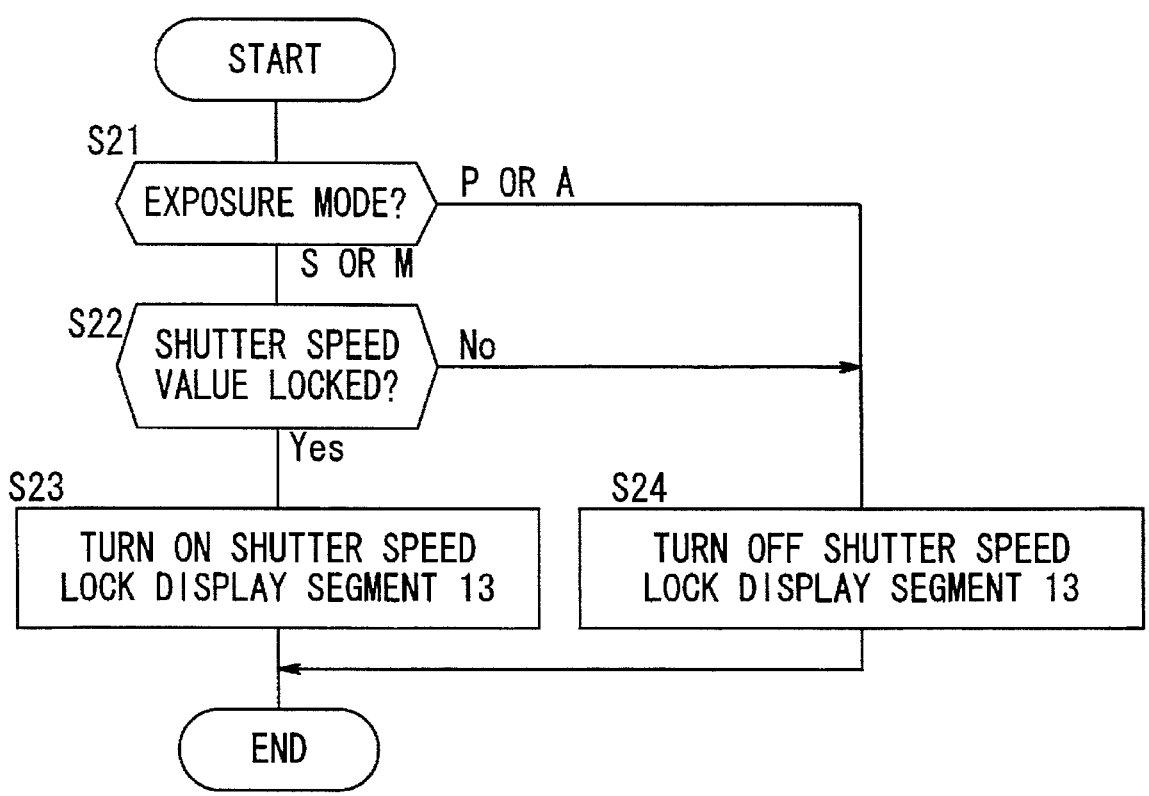
FIG. 9 is a flow chart showing the operation of a program for turning on and off a shutter speed lock indicator, for the first preferred embodiment.
Figure 10:
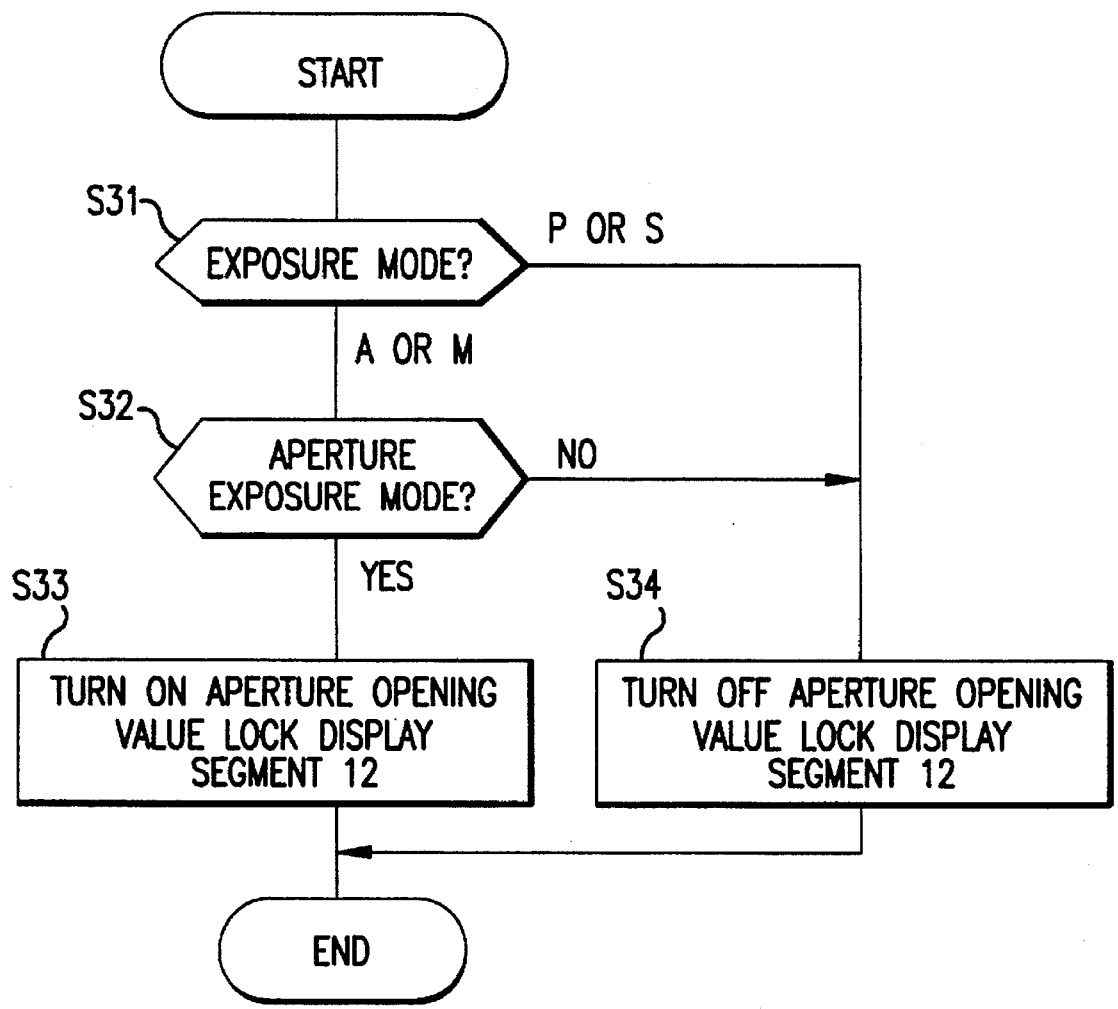
FIG. 10 is a flow chart showing the operation of a program for turning on and off an aperture opening value lock indicator, for the first preferred embodiment.

FIG. 9 is a flow chart showing the operation of a program for turning on and off the shutter speed lock indication, while FIG. 10 is a flow chart showing the operation of a program for turning on and off the aperture opening value lock indication. The action of turning on and off these lock indications for shutter speed and aperture opening value will now be explained with reference to these flow charts. The microcomputer incorporated in this controller 10 executes this control program at fixed time intervals.

In the step S21 of the FIG. 9 flow chart, a decision is made as to whether or not the currently set exposure mode is the shutter speed priority exposure mode S or the manual exposure mode M; and, if the currently set exposure mode is indeed the shutter speed priority exposure mode S or the manual exposure mode M, then the flow of control proceeds to the step S22; while, if the currently set exposure mode is the automatic program exposure mode P or the aperture priority exposure mode A, then the flow of control is transferred to the step S24. When the currently set exposure mode is indeed the shutter speed priority exposure mode S or the manual exposure mode M, then in the step S22 the currently set locked or unlocked state of the shutter speed, as stored in the memory 10 m, is read out therefrom, and a decision is made as to whether or not the locked state is current.

When, in the shutter speed priority exposure mode S or the manual exposure mode M, the shutter speed is indeed currently locked, then in the step S23 the shutter speed lock display segment 13 of the LCD display panel 4 is turned on, as shown in FIG. 3 and FIG. 4.

However, when the currently set exposure mode is the automatic program exposure mode P or the aperture priority exposure mode A, or when, although the shutter speed priority exposure mode S or the manual exposure mode M is currently set, the shutter speed is currently not locked, then in the step S24 the shutter speed lock display segment 13 of the LCD display panel 4 is turned off.

In the step S31 of the FIG. 10 flow chart, a decision is made as to whether or not the currently set exposure mode is the aperture priority exposure mode A or the manual exposure mode M; and if the currently set exposure mode is indeed the aperture priority exposure mode A or the manual exposure mode M then the flow of control proceeds to the step S32, while if the currently set exposure mode is the automatic program exposure mode P or the shutter speed priority exposure mode S then the flow of control is transferred to the step S34. When the currently set exposure mode is indeed the aperture priority exposure mode A or the manual exposure mode M, then in the step S32 the currently set locked or unlocked state of the aperture opening value, as stored in the memory 10 m, is read out therefrom, and a decision is made as to whether or not the locked state is current.

When, in the aperture priority exposure mode A or the manual exposure mode M, the aperture opening value is indeed currently locked, then in the step S33 the aperture opening value lock display segment 12 of the LCD display panel 4 is turned on, as shown in FIG. 3 and FIG. 5.

However, when the currently set exposure mode is the automatic program exposure mode P or the shutter speed priority exposure mode S, or when, although the aperture priority exposure mode A or the manual exposure mode M is currently set, the aperture opening value is currently not locked, then in the step S34 the aperture opening value lock display segment 12 of the LCD display panel 4 is turned off.

Figure 11:
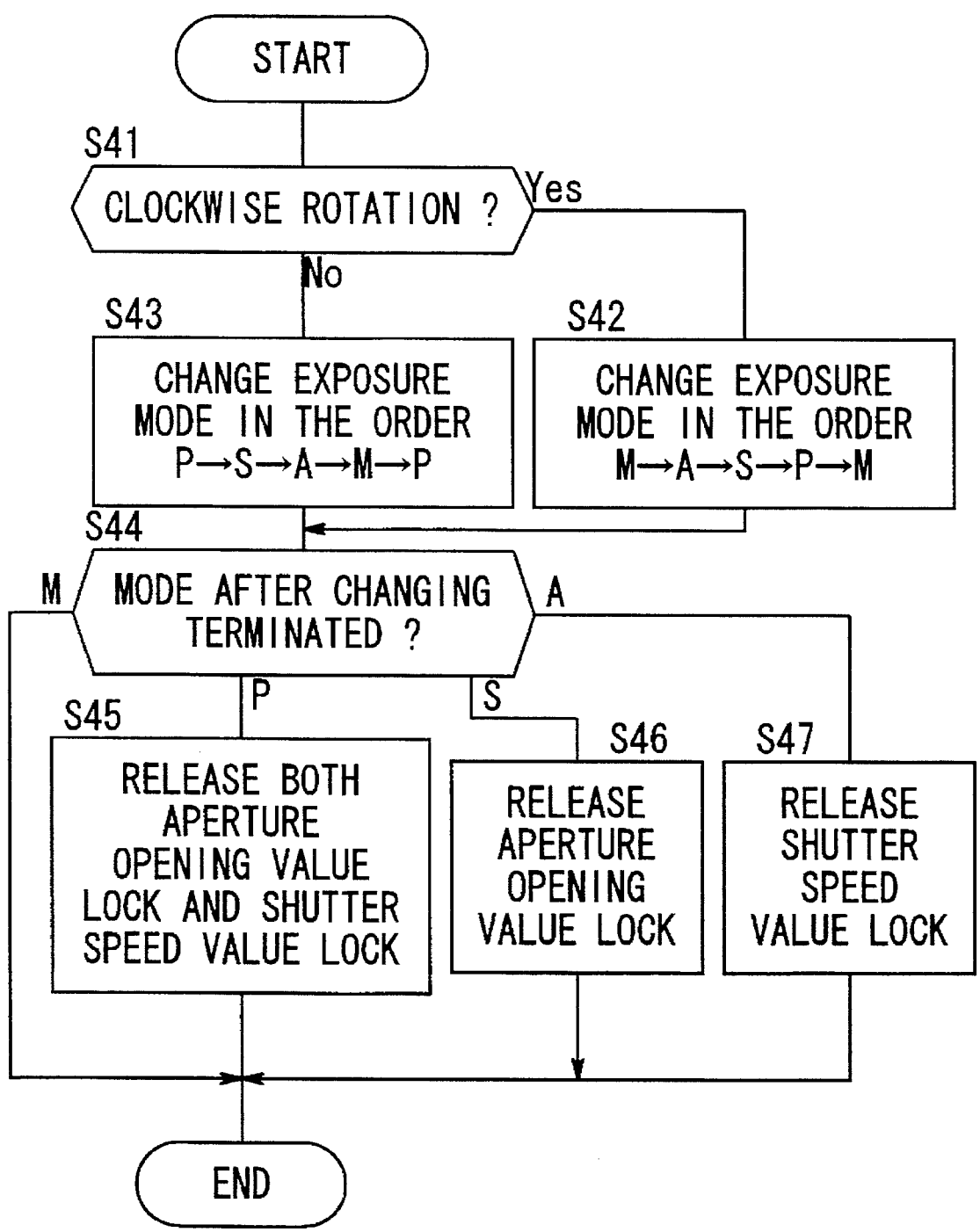
FIG. 11 is a flow chart showing the operation of a program for releasing the locking of shutter speed and aperture opening value when the exposure mode has been changed over, for the first preferred embodiment.

FIG. 11 is a flow chart showing the operation of a program for releasing the locking of shutter speed and aperture opening value when the exposure mode has been changed over.

When the command dial 2 is operated by being rotated while the exposure mode button 6 is being kept depressed, the microcomputer incorporated in the controller 10 starts to execute this control program. In the step S41, a decision is made as to whether or not the direction in which the command dial 2 is being rotated is the clockwise rotational direction, based upon the pulse signal output from the pulse generator 2p. When the command dial 2 is being rotated in the clockwise rotational direction, then the flow of control proceeds to the step S42, in which, in correspondence with the pulse signal which is being input from the pulse generator 2p, the exposure mode is changed over in the cyclical order (mode M)→(mode A)→(mode S)→(mode P)→(mode M). On the other hand, when the command dial 2 is being rotated in the counterclockwise rotational direction, then in the step S43, in correspondence with the pulse signal which is being input from the pulse generator 2p, the exposure mode is changed over in the cyclical order (mode P)→(mode S)→(mode A)→(mode M)→(mode P).

In the step S44 the exposure mode after alteration thereof is tested, and then, according to the exposure mode setting after alteration, the operation of releasing the locking conditions is performed.

When the exposure mode has been changed from any one of the shutter speed priority exposure mode S, the aperture priority exposure mode A, or the manual exposure mode M to the automatic program exposure mode P, then in the step S45, even if the shutter speed and/or the aperture opening value had been locked in the previously set shutter speed priority exposure mode S, aperture priority exposure mode A, or manual exposure mode M, now either/both of these locked states are released, and the unlocked states for both shutter speed and also aperture opening value are stored in the memory 10 m.

When the exposure mode has been changed from any one of the shutter speed priority exposure mode S, the aperture priority exposure mode A, or the manual exposure mode M to the automatic program exposure mode P, so that as described above the locking states for the shutter speed and/or the aperture opening value have been released, and when immediately thereafter the indication turning on and off control programs whose flow charts are shown in FIGS. 9 and 10 are executed, then in their respective steps S24 and S34 the shutter speed lock display segment 13 and the aperture opening value lock display segment 12 are turned off.

When the exposure mode has been changed from any one of the aperture priority exposure mode A, the manual exposure mode M, or the automatic program exposure mode P to the shutter speed priority exposure mode S, then in the step S46, even if the aperture opening value had been locked in the previously set aperture priority exposure mode A or manual exposure mode M, now this locked state is released, and the unlocked state for aperture opening value is stored in the memory 10 m.

When the exposure mode has been changed from any one of the aperture priority exposure mode A, the manual exposure mode M, or the automatic program exposure mode P to the shutter speed priority exposure mode S, so that as described above the locking state for the aperture opening value has been released, and when immediately thereafter the indication turning on and off control program whose flow chart is shown in FIG. 10 is executed, then in its step S34 the aperture opening value lock display segment 12 is turned off.

When the exposure mode has been changed from any one of the shutter speed priority exposure mode S, the manual exposure mode M, or the automatic program exposure mode P to the aperture priority exposure mode A, then in the step S47, even if the shutter speed value had been locked in the previously set shutter speed priority exposure mode S or manual exposure mode M, now this locked state is released, and the unlocked state for shutter speed is stored in the memory 10 m.

When the exposure mode has been changed from any one of the shutter speed priority exposure mode S, the manual exposure mode M, or the automatic program exposure mode P to the aperture priority exposure mode A, so that as described above the locking state for the shutter speed value has been released, and when immediately thereafter the indication turning on and off control program whose flow chart is shown in FIG. 9 is executed, then in its step S24 the shutter speed lock display segment 13 is turned off.

In this manner the construction is such that, even if the shutter speed is locked in the shutter speed priority exposure mode S or in the manual exposure mode M, when the exposure mode is subsequently changed to the automatic program exposure mode P or to the aperture priority exposure mode A, the locking of the shutter speed is cancelled, and also the indication of the shutter speed locked state is turned off. Further, the construction is such that, even if the aperture opening value is locked in the aperture priority exposure mode A or in the manual exposure mode M, when the exposure mode is subsequently changed to the automatic program exposure mode P or to the shutter speed priority exposure mode S, the locking of the aperture opening value is cancelled, and also the indication of the aperture opening value locked state is turned off. By doing this, the locking and unlocking of the exposure values in correspondence with the exposure mode after alteration, as well as the display of their lock states, is appropriately performed, and it becomes possible to alter the exposure values for the new exposure mode.

Second Preferred Embodiment

The second preferred embodiment of the present invention, which is a variant of the first preferred embodiment described above, will now be explained. In this second preferred embodiment, the construction is such that, when photography is performed in a first specified exposure mode and an exposure value is locked, and then subsequently photography is performed in a different exposure mode using a different exposure value, then it is simply and easily possible, when the exposure mode setting is returned to the first exposure mode, again to use the exposure value which was previously locked in that first exposure mode. This second preferred embodiment will now be described with reference to FIGS. 12 through 14; the explanation will focus upon the points of difference from the first preferred embodiment described above and shown in FIGS. 1 through 11.

Figure 12:
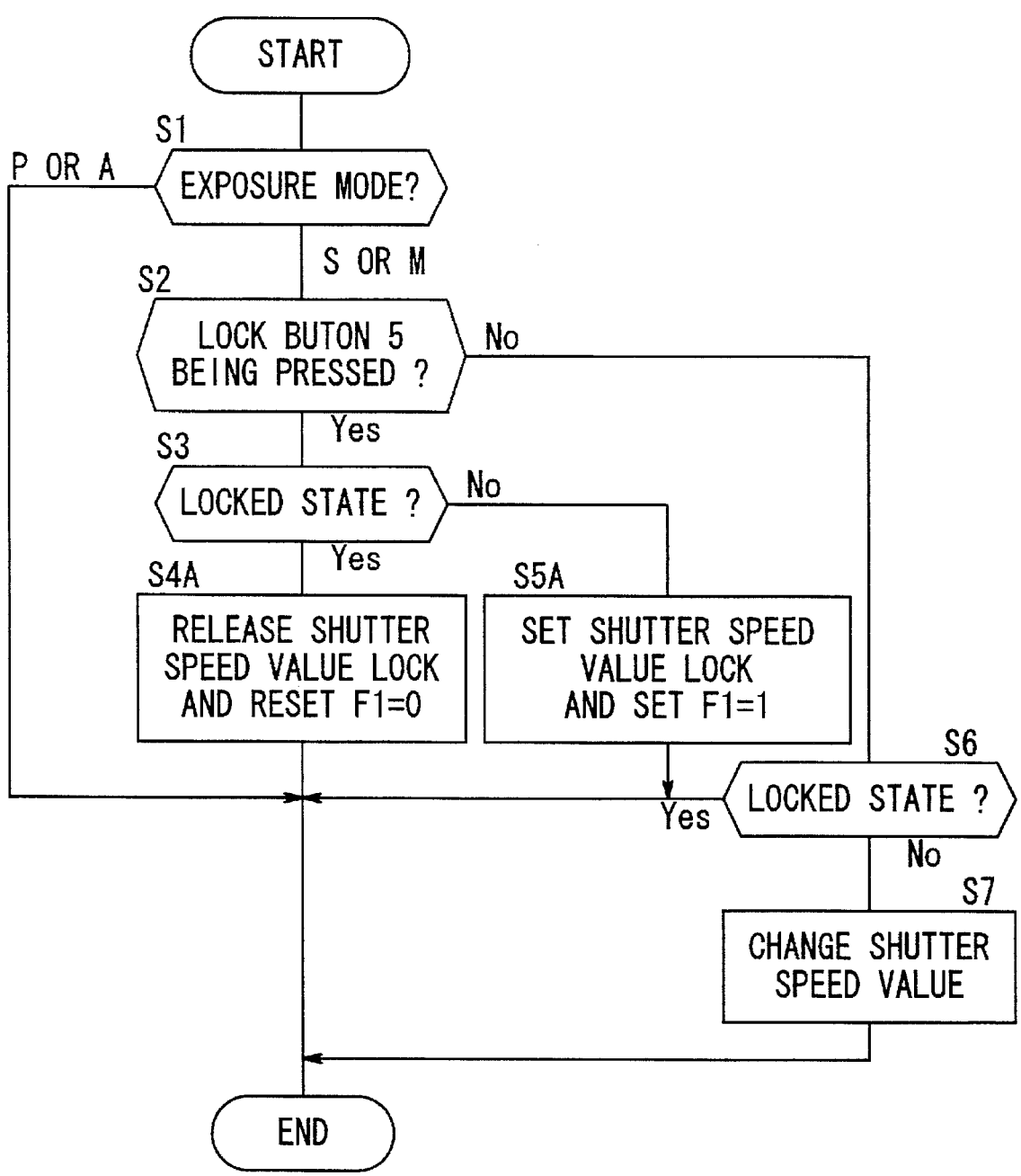
FIG. 12 is a flow chart showing the operation of a program for controlling shutter speed lock and unlock and shutter speed change, for a second preferred embodiment of the present invention.

FIG. 12 is a flow chart showing the control program for processing the locking and unlocking of the shutter speed value: this program differs from the FIG. 7 program for the first preferred embodiment in one portion, as follows. In this flow chart, in the step S4A, along with releasing the locking of the shutter speed value and storing this unlocked state in the memory 10 m, further a flag F1 is reset to zero. This flag F1 is a flag for storing the fact that, in the shutter speed priority exposure mode S or the manual exposure mode M, shutter speed lock setting or release has been performed, and when this flag F1 is set to 1 this indicates that lock setting action has been performed, while when it is reset to 0 this indicates that lock release action has been performed. However, the value of this flag F1 has no relation to the actual current locked or unlocked state of the shutter speed value. This actual current locked or unlocked state of the shutter speed value is stored separately in the memory 10 m as described above.

In an identical manner, in the step S5A of this program, along with locking the shutter speed to its currently set value and storing this value and also the locked state in the memory 10 m, further the flag F1 is set to unity.

Figure 13:
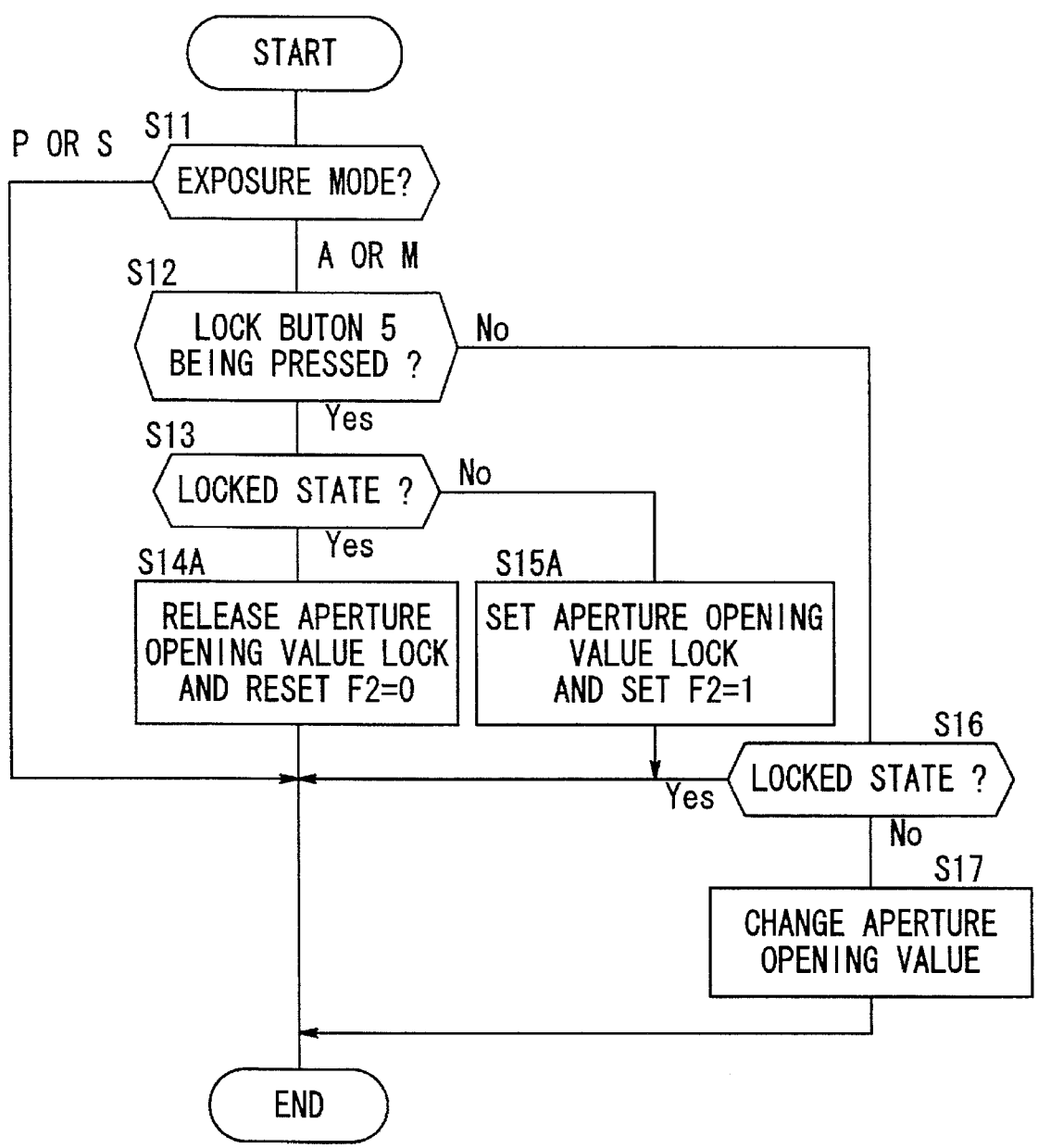
FIG. 13 is a flow chart showing the operation of a program for controlling aperture opening value lock and unlock and aperture opening value change, for the second preferred embodiment.

FIG. 13 is a flow chart showing the control program for processing the locking and unlocking of the aperture opening value: this program differs from the FIG. 8 program for the first preferred embodiment in one portion, as follows. In this flow chart, in the step S14A, along with releasing the locking of the aperture opening value and storing this unlocked state in the memory 10 m, further a flag F2 is reset to zero. This flag F2 is a flag for storing the fact that, in the aperture priority exposure mode A or the manual exposure mode M, aperture opening value lock setting or release has been performed, and when this flag F2 is set to 1 this indicates that lock setting action has been performed, while when it is reset to 0 this indicates that lock release action has been performed. However, the value of this flag F2 has no relation to the actual current locked or unlocked state of the aperture opening value. This actual current locked or unlocked state of the aperture opening value is stored separately in the memory 10 m as described above.

In an identical manner, in the step S15A of this program, along with locking the aperture opening value to its currently set value and storing this value and also the locked state in the memory 10 m, further the flag F2 is set to unity.

Figure 14:
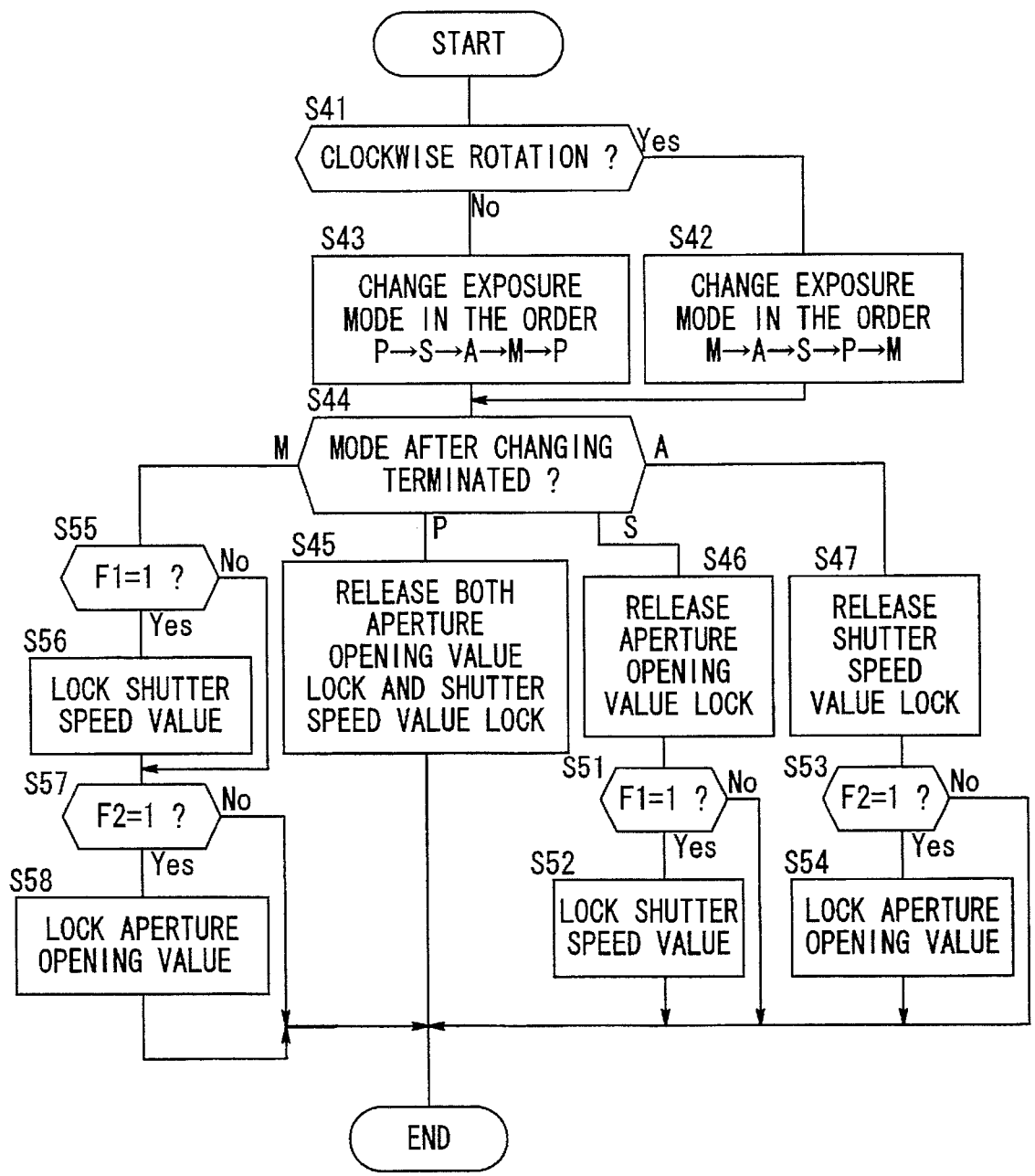
FIG. 14 is a flow chart showing the operation of a program for releasing the locking of shutter speed and aperture opening value when the exposure mode has been changed over, for the second preferred embodiment.

FIG. 14 is a flow chart showing the control program for processing the release of the locking of shutter speed and aperture opening value when the exposure mode has been changed over, which differs from the FIG. 11 flow chart for the first preferred embodiment to some extent. In this flow chart, when the exposure mode after changing over thereof has been terminated is the shutter speed priority exposure mode S, then in the step S46, even if the aperture opening value in the previously set aperture priority exposure mode A or manual exposure mode M is locked, this locked state is released, and this unlocked state is stored in the memory 10 m. By doing this, when immediately thereafter the indication turning on and off control program whose flow chart is shown in FIG. 10 is executed, the aperture opening value lock display segment 12 is turned off.

Next the flow of control proceeds to the step S51, in which a decision is made as to whether or not the flag F1 is currently set to unity, i.e. as to whether or not in the previous exposure mode before changing over lock setting of the shutter speed has been performed. When in the previous exposure mode before changing over lock setting of the shutter speed has been performed, then in the step S52 the shutter speed value which has been locked is read out from the memory 10 m and is set, and further the shutter speed is locked to this shutter speed value and the locked state is stored in the memory 10 m.

By doing this, after a particular shutter speed has been locked in the shutter speed priority exposure mode S or the manual exposure mode M, another exposure mode may be changed over to, and next, when again the shutter speed priority exposure mode S is shifted to, the previously locked shutter speed value is set and is locked. Immediately thereafter the indication turning on and off control program whose flow chart is shown in FIG. 9 is executed, and the shutter speed lock display segment 13 is turned on.

In an identical manner, when the exposure mode after changing over thereof has been terminated is the aperture priority exposure mode A, then in the step S47, even if the shutter speed value in the previously set shutter speed priority exposure mode S or manual exposure mode M is locked, this locked state is released, and this unlocked state is stored in the memory 10 m. By doing this, when immediately thereafter the indication turning on and off control program whose flow chart is shown in FIG. 9 is executed, the shutter speed lock display segment 13 is turned off.

Next the flow of control proceeds to the step S53, in which a decision is made as to whether or not the flag F2 is currently set to unity, i.e. as to whether or not in the previous exposure mode before changing over lock setting of the aperture opening value has been performed. When in the previous exposure mode before changing over lock setting of the aperture opening value has been performed, then in the step S54 the aperture opening value which has been locked is read out from the memory 10 m and is set, and further the aperture opening is locked to this aperture opening value and the locked state is stored in the memory 10 m.

By doing this, after a particular aperture opening value has been locked in the aperture priority exposure mode A or the manual exposure mode M, another exposure mode may be changed over to, and next when again the aperture priority exposure mode A is shifted to, the previously locked aperture opening value is set and is locked. Immediately thereafter the indication turning on and off control program whose flow chart is shown in FIG. 10 is executed, and the aperture opening value lock display segment 12 is turned on.

When the exposure mode after changing over thereof has been terminated is the manual exposure mode M, then in the step S55 a decision is made as to whether or not the flag F1 is currently set to unity, i.e. as to whether or not in the previous exposure mode before changing over lock setting of the shutter speed has been performed. When in the previous exposure mode before changing over lock setting of the shutter speed has been performed, then the flow of control proceeds to the step S56, while if not this step S56 is skipped. In this step S56, the shutter speed value which has been locked is read out from the memory 10 m and is set, and further the shutter speed is locked to this shutter speed value and the locked state is stored in the memory 10 m.

Next, the flow of control proceeds to the step S57, in which a decision is made as to whether or not the flag F2 is currently set to unity, i.e. as to whether or not in the previous exposure mode before changing over lock setting of the aperture opening value has been performed. When in the previous exposure mode before changing over lock setting of the aperture opening value has been performed, then the flow of control proceeds to the step S58, while if not processing by this program terminates. In this step S58, the aperture opening value which has been locked is read out from the memory 10 m and is set, and further the aperture opening is locked to this aperture opening value and the locked state is stored in the memory 10 m.

By doing this, after a particular shutter speed and/or aperture opening value is locked in any one of the shutter speed priority exposure mode S, the aperture priority exposure mode A, and the manual exposure mode M, and the camera is changed over to another exposure mode, next when again the manual exposure mode M is returned to, the previously locked shutter speed and/or aperture opening value are set and are locked. Further, by the execution immediately thereafter of the indication turning on and off control programs whose flow charts are shown in FIGS. 9 and 10, the aperture opening value lock display segment 12 and/or the shutter speed lock display segment 13 are turned on and off, according to the lock state and unlock state for the shutter speed and/or the aperture opening value as stored in the memory 10 m.

In this manner, when photography is performed in a particular exposure mode with an exposure value locked, photography may be performed while temporarily changing to another exposure mode by using any value for this exposure value, and then when the system is returned to the original exposure mode the value of this exposure value which was locked in this previous exposure mode is automatically reinstated; and, provided that unlock operation for that particular exposure mode is not performed, in that particular exposure mode any desired exposure value can be set, so that the convenience of use is enhanced.

Furthermore, although in the above described first and second preferred embodiments of the present invention the construction is such that, when the exposure mode has been changed over, lock and unlock of the exposure values corresponding to the new exposure mode, and the display thereof, are performed, it would also be acceptable, according to the principles of the present invention, after the exposure mode has been changed over, for the locking of all of the exposure values (without any relation to the exposure mode) to be cancelled, and for all of the lock state display indications to be turned off.

Further, although the above described first and second preferred embodiments of the present invention were described by way of example as information setting devices for an electronic still camera, this is not intended to be limiting; the present invention can also be applied, for example, to a normal type of camera.

We claim:

1. An information setting device for a camera, comprising:
    a first operation member;
    a second operation member which is different from said first operation member;
    a setting change means for changing the set content of a previously set first item of control information in response to unaccompanied operation of said first operation member, and for changing the set content of a previously set second item of control information which differs from said first item of control information in response to a specific coordinated operation of said first operation member and said second operation member together;
    an internal setting change means for changing the set content of said first item of control information when the set content of said second item of control information is changed to a predetermined content by said setting change means, based upon said predetermined set content of said second item of control information;
    a valid/invalid mode setting means for setting one of a valid mode which permits processing for change of the set content of said first item of control information, and an invalid mode which prohibits processing for change of the set content of said first item of control information; and
    a valid/invalid mode changeover means for changing over from said invalid mode to said valid mode when the set content of said second item of control information is changed to said predetermined content by said setting change means while said invalid mode is being set.

2. An information setting device for a camera according to claim 1, further comprising:
    a display means for displaying said valid mode or said invalid mode; and wherein
    said valid/invalid mode changeover means changes over the display of said display means to said valid mode when the set content of said second item of control information is changed to said predetermined content by said setting change means while said invalid mode is being set.

3. An information setting device for a camera according to claim 1, further comprising:

a memory means for storing the content of said first item of control information at the time point that said invalid mode is set by said valid/invalid mode setting means; and wherein when said invalid mode is set while a first content of said second item of control information is being set, thereafter said second item of control information is changed over to a content other than said first content, and next again said first content is set, said valid/invalid mode changeover means sets said invalid mode and sets said content of said first item of control information which is stored in said memory means.

4. An information setting device for a camera according to claim 1, wherein said first item of control information is shutter speed or aperture opening value, and said second item of control information is exposure mode.

5. An information setting device for a camera according to claim 2, further comprising a memory means for storing the content of said first item of control information at the time point that said invalid mode is set by said valid/invalid mode setting means; and wherein when said invalid mode is set while a first content of said second item of control information is being set, thereafter said second item of control information is changed over to a content other than said first content, and next again said first content is set, said valid/invalid mode changeover means sets said invalid mode and sets said content of said first item of control information which is stored in said memory means.

6. An information setting device for a camera according to claim 2, wherein said first item of control information is shutter speed or aperture opening value, and said second item of control information is exposure mode.

7. An information setting device for a camera according to claim 3, wherein said first item of control information is shutter speed or aperture opening value, and said second item of control information is exposure mode.

8. An information setting device for a camera, comprising:

an operation dial;

a function designation operation member which is different from said operation dial;

a setting change section to which said operation dial and said function designation operation member are connected, and which changes the set value of shutter speed or aperture opening value in response to unaccompanied operation of said operation dial, and which changes the setting of exposure mode in response to a specific coordinated operation of said operation dial and said function designation operation member together;

an internal setting change section which changes the set values of said shutter speed and aperture opening when said exposure mode is changed to a predetermined exposure mode by said setting change section, based upon said predetermined exposure mode;

a valid/invalid mode setting operation member;

a valid/invalid mode setting section to which said valid/invalid mode setting operation member is connected, and which in response to the operation of said valid/invalid mode setting operation member sets one of a valid mode which permits processing by said setting change section for change of the set value of shutter speed or aperture opening, and an invalid mode which prohibits processing by said setting change section for change of the set value of shutter speed or aperture opening; and a valid/invalid mode changeover section which changes over from said invalid mode to said valid mode when the set exposure mode is changed to said predetermined exposure mode by said setting change section while said invalid mode is being set.

9. An information setting device for a camera according to claim 8, further comprising:

a display device which displays said valid mode or said invalid mode; and wherein said valid/invalid mode changeover section changes over an indication of said invalid mode upon said display device to an indication of said valid mode when the set exposure mode is changed to said predetermined exposure mode by said setting change section while said invalid mode is being set.

10. An information setting device for a camera according to claim 8, further comprising:

a memory section which stores the value of shutter speed or aperture opening at the time point that said invalid mode is set by said valid/invalid mode setting section; and wherein when said invalid mode is set while a first exposure mode is being set, thereafter said first exposure mode is changed over to an exposure mode other than said first exposure mode, and next again said first exposure mode is set, said valid/invalid mode changeover section sets said invalid mode and sets said value of shutter speed or aperture opening which is stored in said memory section.

11. An information setting device for a camera according to claim 8, wherein:

said exposure mode includes at least a program automatic exposure mode;

said valid mode includes a shutter speed valid mode in which processing for change of the set value for the shutter speed is permitted, and an aperture opening value valid mode in which processing for change of the set value for the aperture opening is permitted;

said invalid mode includes a shutter speed invalid mode in which processing for change of the set value for the shutter speed is prohibited, and an aperture opening value invalid mode in which processing for change of the set value for the aperture opening is prohibited;

said valid/invalid mode changeover section, when said exposure mode is changed over to said program automatic exposure mode by said setting change section, if said aperture opening value invalid mode is set, changes over said aperture opening value invalid mode to said aperture opening value valid mode, and, if said shutter speed invalid mode is set, changes over said shutter speed invalid mode to said shutter speed valid mode; and said internal setting change section changes the set values of said shutter speed and aperture opening when said exposure mode is changed to said program automatic exposure mode by said setting change section, based upon said program automatic exposure mode.

12. An information setting device for a camera according to claim 8, wherein:

said exposure mode includes at least a shutter speed priority exposure mode;

said valid mode includes a shutter speed valid mode in which processing for change of the set value for said shutter speed is permitted, and an aperture opening value valid mode in which processing for change of the set value for said aperture opening is permitted;

said invalid mode includes a shutter speed invalid mode in which processing for change of the set value for said shutter speed is prohibited, and an aperture opening value invalid mode in which processing for change of the set value for said aperture opening is prohibited;

said valid/invalid mode changeover section changes over said aperture opening value invalid mode to said aperture opening value valid mode when said exposure mode is changed over to said shutter speed priority exposure mode by said setting change section while said aperture opening value invalid mode is being set; and said internal setting change section changes the set value of said aperture opening when said exposure mode is changed to said shutter speed priority exposure mode by said setting change section, based upon said shutter speed priority exposure mode.

13. An information setting device for a camera according to claim 8, wherein:

said exposure mode includes at least an aperture priority exposure mode;

said valid mode includes a shutter speed valid mode in which processing for change of the set value for said shutter speed is permitted, and an aperture opening value valid mode in which processing for change of the set value for said aperture opening is permitted;

said invalid mode includes a shutter speed invalid mode in which processing for change of the set value for said shutter speed is prohibited, and an aperture opening value invalid mode in which processing for change of the set value for said aperture opening is prohibited;

said valid/invalid mode changeover section changes over said shutter speed invalid mode to said shutter speed valid mode when said exposure mode is changed over to said aperture priority exposure mode by said setting change section while said shutter speed invalid mode is being set; and said internal setting change section changes the set value of said shutter speed when said exposure mode is changed to said aperture priority exposure mode by said setting change section, based upon said aperture priority exposure mode.

14. An information setting device for a camera according to claim 9, further comprising:

a memory section which stores the value of shutter speed or aperture opening at the time point that said invalid mode is set by said valid/invalid mode setting section; and wherein when said invalid mode is set while a first exposure mode is being set, thereafter said first exposure mode is changed over to an exposure mode other than said first exposure mode, and next again said first exposure mode is set, said valid/invalid mode changeover section sets said invalid mode and sets said value of shutter speed or aperture opening which is stored in said memory section.

15. An information setting device for a camera, comprising:

an operation dial for shutter speed;

an operation dial for aperture opening value;

an exposure mode switch;

a valid/invalid mode switch; and a control circuit to which said shutter priority operation dial, said aperture opening value operation dial, said exposure mode switch, and said valid/invalid mode switch are connected; wherein said control circuit:

changes the set value of shutter speed in response to unaccompanied operation of said operation dial for shutter speed, changes the set value of aperture opening in response to unaccompanied operation of said operation dial for aperture opening value, and changes the set mode of exposure mode, which includes at least an automatic program exposure mode, a shutter speed priority exposure mode, and an aperture priority exposure mode, in response to a specific coordinated operation of said operation dial for shutter speed and said exposure mode switch together; and:

in response to coordinated operation of said operation dial for shutter speed and said valid/invalid mode switch together, sets a shutter speed invalid mode with processing prohibited for changing of the set value of shutter speed when a shutter speed valid mode with processing permitted for change of the set value of shutter speed is set, and sets said shutter speed valid mode when said shutter speed invalid mode is set; and, in response to coordinated operation of said operation dial for aperture opening value and said valid/invalid mode switch together, sets an aperture opening value invalid mode with processing prohibited for changing of the set value of aperture opening when an aperture opening value valid mode with processing permitted for change of the set value of aperture opening value is set, and sets said aperture opening value valid mode when said aperture opening value invalid mode is set; and:

when said exposure mode is changed to said program automatic exposure mode, if said aperture opening value invalid mode is set, changes over said aperture opening value invalid mode to said aperture opening value valid mode, if said shutter speed invalid mode is set, changes over said shutter speed invalid mode to said shutter speed valid mode, and changes the set values of shutter speed and aperture opening based upon said automatic program exposure mode; when said exposure mode is changed to said shutter speed priority exposure mode, if said aperture opening value invalid mode is set, changes over said aperture opening value invalid mode to said aperture opening value valid mode, and changes the set value of aperture opening based upon said shutter speed priority exposure mode; and when said exposure mode is changed to said aperture priority exposure mode, if said shutter speed invalid mode is set, changes over said shutter speed invalid mode to said shutter speed valid mode, and changes the set value of shutter speed based upon said aperture priority exposure mode.

16. An information setting device for a camera according to claim 15, wherein said control circuit, instead of in response to operation of said operation dial for shutter speed while said exposure mode switch is being operated, changes the set mode of said exposure mode, which includes at least said automatic program exposure mode, said shutter speed priority exposure mode, and said aperture priority exposure mode, in response to the operation of said operation dial for aperture opening value while said exposure mode switch is being operated.

17. An information setting device for a camera according to claim 15, further comprising:

a display device which displays said shutter speed valid mode or said shutter speed invalid mode, and said aperture opening value valid mode or said aperture opening value invalid mode; and wherein said control circuit, when said exposure mode is changed over to said program automatic exposure mode, if said aperture opening value invalid mode is being displayed changes over the display of said aperture opening value invalid mode to a display of said aperture opening value valid mode, and if said shutter speed invalid mode is being displayed, changes over the display of said shutter speed invalid mode to a display of said shutter speed valid mode; when said exposure mode is changed over to said shutter speed priority exposure mode, if said aperture opening value invalid mode is being displayed changes over the display of said aperture opening value invalid mode to a display of said aperture opening value valid mode; and when said exposure mode is changed over to said aperture priority exposure mode, if said shutter speed invalid mode is being displayed, changes over the display of said shutter speed invalid mode to a display of said shutter speed valid mode.

18. An information setting device for a camera according to claim 15, further comprising:

a memory section which stores the value of shutter speed at the time point that said shutter speed invalid mode is set, and stores the value of aperture opening at the time point that said aperture opening value invalid mode is set; and wherein, when said control circuit changes over from a first exposure mode in which said shutter speed invalid mode was set to another exposure mode which is different from said first exposure mode, and when said control circuit next again sets said first exposure mode, said control circuit sets said shutter speed invalid mode and sets said shutter speed which is stored in said memory section; and also when said control circuit changes over from a second exposure mode in which said aperture opening value invalid mode was set to another exposure mode which is different from said second exposure mode, and when said control circuit next again sets said second exposure mode, said control circuit sets said aperture opening value invalid mode and sets said aperture opening value which is stored in said memory section.

* * * * *